US012684544B2

(12) United States Patent
Peng et al.

(10) Patent No.: US 12,684,544 B2
(45) Date of Patent: Jul. 14, 2026

(54) RESOURCE DETERMINING METHOD AND DEVICE

(71) Applicant: VIVO MOBILE COMMUNICATION CO., LTD., Dongguan (CN)

(72) Inventors: Shuyan Peng, Dongguan (CN); Zichao Ji, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 765 days.

(21) Appl. No.: 17/956,792

(22) Filed: Sep. 29, 2022

(65) Prior Publication Data

US 2023/0025780 A1      Jan. 26, 2023

Related U.S. Application Data

(63) Continuation of application No. PCT/CN2021/085975, filed on Apr. 8, 2021.

(30) Foreign Application Priority Data

Apr. 9, 2020   (CN) .......................... 202010276460.2

(51) Int. Cl.
*H04W 72/0453*        (2023.01)

(52) U.S. Cl.
CPC ............................... *H04W 72/0453* (2013.01)

(58) Field of Classification Search
CPC . H04W 72/0453; H04W 72/20; H04W 72/40; H04W 72/02; H04W 72/25; H04W 72/1263; H04W 72/232; H04W 72/542; H04W 4/40; H04W 28/26; H04W 92/18; H04W 24/02; H04L 5/0005; H04L 5/0094
See application file for complete search history.

(56) References Cited

U.S. PATENT DOCUMENTS

| | | | | |
|---|---|---|---|---|
| 10,237,893 B2 * | 3/2019 | Seo | .................. | H04W 74/0808 |
| 10,798,709 B2 * | 10/2020 | Feng | ................ | H04W 72/0446 |
| 11,616,630 B2 * | 3/2023 | Ji | .......................... | H04L 5/0044 |
| | | | | 370/329 |
| 11,778,518 B2 * | 10/2023 | Huang | .................. | H04W 28/26 |
| | | | | 370/329 |
| 11,997,623 B2 * | 5/2024 | Liu | ..................... | H04W 56/001 |

(Continued)

FOREIGN PATENT DOCUMENTS

| | | |
|---|---|---|
| CN | 109391976 A | 2/2019 |
| CN | 109392134 A | 2/2019 |

(Continued)

OTHER PUBLICATIONS

First Office Action issued in related Chinese Application No. 202010276460.2, mailed Dec. 28, 2023, 7 pages.

(Continued)

*Primary Examiner* — Brian T O Connor
(74) *Attorney, Agent, or Firm* — IPX PLLC

(57) ABSTRACT

A resource determining method and device are provided. The method may be performed by a terminal device, including: determining a remaining frequency domain resource in a resource pool according to a sub-channel size; and using the remaining frequency domain resource as a first sub-channel independently, or containing the remaining frequency domain resource in the resource pool within a second sub-channel.

20 Claims, 2 Drawing Sheets

100

Determine a remaining frequency domain resource in a resource pool according to a sub-channel size  ⌐S102

Use the remaining frequency domain resource as a first sub-channel independently, or contain the remaining frequency domain resource in the resource pool within a second sub-channel  ⌐S104

(56) References Cited

U.S. PATENT DOCUMENTS

| | | | | |
|---|---|---|---|---|
| 12,082,194 | B2 * | 9/2024 | Park | H04L 5/00 |
| 12,166,728 | B2 * | 12/2024 | Zhao | H04L 5/14 |
| 12,206,507 | B2 * | 1/2025 | Lee | H04L 5/0044 |
| 2018/0234889 | A1 | 8/2018 | Baghel et al. | |
| 2019/0014577 | A1 | 1/2019 | Yang et al. | |
| 2020/0053704 | A1 | 2/2020 | Kim et al. | |
| 2020/0221423 | A1 * | 7/2020 | Wang | H04W 72/02 |
| 2021/0211246 | A1 * | 7/2021 | Xiang | H04L 5/0044 |
| 2021/0321370 | A1 * | 10/2021 | Lee | H04W 72/02 |
| 2022/0007237 | A1 * | 1/2022 | Huang | H04L 47/76 |
| 2022/0240237 | A1 * | 7/2022 | Park | H04W 4/70 |
| 2022/0286265 | A1 * | 9/2022 | Zhao | H04L 5/0092 |
| 2022/0376859 | A1 * | 11/2022 | Lee | H04L 5/0048 |
| 2022/0399963 | A1 * | 12/2022 | Lee | H04W 74/0808 |
| 2022/0400477 | A1 * | 12/2022 | Lee | H04W 72/20 |
| 2022/0400484 | A1 * | 12/2022 | Lee | H04W 72/02 |
| 2023/0037535 | A1 * | 2/2023 | Luo | H04L 5/0094 |
| 2023/0069535 | A1 * | 3/2023 | Luo | H04W 72/1263 |
| 2023/0073686 | A1 * | 3/2023 | Li | H04L 5/0092 |
| 2023/0124535 | A1 * | 4/2023 | Luo | H04L 5/0092 370/280 |
| 2023/0299909 | A1 * | 9/2023 | Lee | H04W 4/40 370/329 |
| 2023/0362893 | A1 * | 11/2023 | Shin | H04L 1/1896 |
| 2025/0055664 | A1 * | 2/2025 | Zhao | H04L 5/14 |
| 2025/0294527 | A1 * | 9/2025 | Zhao | H04W 72/0453 |

FOREIGN PATENT DOCUMENTS

| | | |
|---|---|---|
| CN | 110932827 A | 3/2020 |
| WO | 2021172222 A1 | 9/2021 |

OTHER PUBLICATIONS

"R1-1913255 Intel-V2X_SL_L1_Struct (rev R1-1912203)", 3GPP tsg_ran\wg1_rl1, Nov. 2019, 34 pages.

Notice of Reason for refusal issued in related Japanese Application No. 2022-562007, Jan. 30, 2024, 3 pages.

International Search Report issued in corresponding International Application No. PCT/CN2021/085975, mailed May 27, 2021, 6 pages.

Intel Corporation. Sidelink physical structure for NR V2X communication, 3GPP TSG-RAN WG1 Meeting #99, R1-1913255, Nov. 22, 2019, 35 pages.

Intel Corporation. Remaining opens of sidelink physical structure for NR V2X design, 3GPP TSG-RAN WG1 Meeting #100-E, R1-2000729, Mar. 6, 2020, 15 pages.

Extended European Search Report issued in related European Application No. 21784043.8, mailed Jul. 12, 2023, 7 pages.

LG Electronics, "Discussion on physical layer structure for NR sidelink", 3GPP TSG RAN WG1 Meeting #100 e-Meeting, R1-2000781,Feb. 2020, 32 pages.

Notice of reason of refusal issued in related Japanese Application No. 2022-562007, mailed Sep. 19, 2023, 8 pages.

CATT, "CBR Measurement and Report", 3GPP TSG RAN WG2 #97, R2-1701245, Feb. 2017, 6 pages.

Nokia, "Discussion of physical layer structure for sidelink", 3GPP TSG RAN WG1 #99, R1-1911952, Nov. 2019, 14 pages.

Apple, "On NR V2X Physical Layer Structure", 3GPP TSG RAN WG1 #99, R1-1912810, Nov. 2019, 17 pages.

* cited by examiner

<u>100</u>

Determine a remaining frequency domain resource in a resource pool according to a sub-channel size ~S102

Use the remaining frequency domain resource as a first sub-channel independently, or contain the remaining frequency domain resource in the resource pool within a second sub-channel ~S104

RESOURCE DETERMINING METHOD AND DEVICE

CROSS-REFERENCE TO RELATED APPLICATIONS

This application is a continuation of International Application No. PCT/CN2021/085975, filed on Apr. 8, 2021, which claims priority to Chinese Patent Application No. 202010276460.2, filed on Apr. 9, 2020. The entire contents of each of the above-identified applications are expressly incorporated herein by reference.

TECHNICAL FIELD

Embodiments of the present disclosure relate to the communications field, and in particular, to a resource determining method and device.

BACKGROUND

A Long Term Evolution (LTE) system has supported sidelink since the 12th release, for direct data transmission among terminal devices without via a network device.

The concept of a resource pool is introduced in sidelink, and the resource pool is (pre) configured by the network device and includes resources used for sidelink transmission and transmission related parameters. The maximum frequency domain resource configurable in the resource pool is 275 Physical Resource Blocks (PRBs). In the resource pool, division in the frequency domain is performed using sub-channels, and a sub-channel size may be configured to be 10, 15, 20, 25, 50, 75, 100 (PRBs), or the like. The terminal device in the resource pool performs scheduling in the unit of sub-channel.

The maximum bandwidth of the resource pool in sidelink may be configured to be 275 PRBs. The size of the resource pool is not necessarily an integer multiple of the sub-channel size. Therefore, there are some remaining frequency domain resources. When the terminal device schedules resources, a remaining frequency domain resource fails to be used because a size of the remaining frequency domain resource is less than a sub-channel size defined at a higher layer, resulting in a waste of frequency domain resources.

SUMMARY

According to a first aspect, a resource determining method is provided, and the method is performed by a terminal device, including: determining a remaining frequency domain resource in a resource pool according to a sub-channel size; and using the remaining frequency domain resource as a first sub-channel independently, or containing the remaining frequency domain resource in the resource pool within a second sub-channel.

According to a second aspect, a terminal device is provided, and the terminal device includes: a determining module, configured to determine a remaining frequency domain resource in a resource pool according to a sub-channel size; and a sub-channel division module, configured to use the remaining frequency domain resource as a first sub-channel independently, or contain the remaining frequency domain resource in the resource pool within a second sub-channel.

According to a third aspect, a terminal device is provided, and the terminal device includes a processor, a memory, and a computer program stored on the memory and executable on the processor, where the computer program, when executed by the processor, implements the steps of the resource determining method described in the first aspect.

According to a fourth aspect, a computer-readable storage medium is provided, and the computer-readable storage medium stores a computer program, where the computer program, when executed by a processor, implements the steps of the resource determining method described in the first aspect.

BRIEF DESCRIPTION OF THE DRAWINGS

The accompanying drawings described herein are intended to provide further understanding of this application and constitute a part of this application. Exemplary embodiments of this application and the description thereof are used for explaining this application rather than constituting the improper limitation to this application. In the accompanying drawings.

DETAILED DESCRIPTION

The technical solutions of this application will be described below with reference to specific embodiments of this application and the accompanying drawings. Apparently, the described embodiments are some embodiments rather than all the embodiments of this application. Based on the embodiments of this application, all other embodiments obtained by a person of ordinary skill in the art without creative efforts shall fall within the protection scope of this application. "And/or" in the embodiments of this specification represents at least one of the former and the latter.

It should be understood that the technical solutions in the embodiments of the present disclosure may be applied to various communication systems, for example, an LTE sidelink system, an NR sidelink system, or a subsequent evolution communication system.

In the embodiments of the present disclosure, a terminal device may include, but is not limited to, a roadside unit, an infrastructure, a Mobile Station (MS), a mobile terminal, a mobile telephone, a User Equipment (UE), a handset, a portable equipment, a vehicle, or the like. The terminal device may communicate with one or more core networks through a Radio Access Network (RAN). For example, the terminal device may be a mobile phone (or referred to as a "cellular" phone), or a computer with a wireless communication function, or the terminal device may be a portable, pocket-sized, handheld, computer built-in or in-vehicle mobile device.

Figure 1:
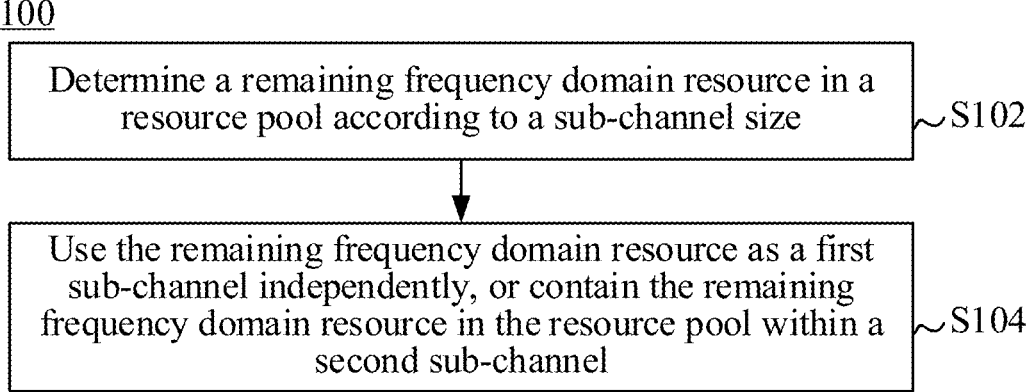
FIG. 1 is a schematic flowchart of a resource determining method according to an embodiment of the present disclosure.

As shown in FIG. 1, an embodiment of the present disclosure provides a resource determining method 100. The method may be performed by a terminal device. In other words, the method may be performed by software or hardware installed on the terminal device. The method 100 includes the following steps:

S102: Determine a remaining frequency domain resource in a resource pool according to a sub-channel size.

The sub-channel size may be configured by higher layer signaling, and the granularity of the sub-channel size may be Physical Resource Blocks (PRBs).

The resource pool may be a resource pool used by the terminal device for sidelink transmission, and the resource pool may be (pre) configured by a network device or by the terminal device.

In some embodiments, the remaining frequency domain resource may be determined by a bandwidth of the resource pool and the sub-channel size configured by a higher layer. In some embodiments, a size of the remaining frequency domain resource is less than the sub-channel size. In some embodiments, for example, if a size of the resource pool is 101 Physical Resource Blocks (PRBs), the sub-channel size configured by the higher layer is 10 PRBs, and each sub-channel size of the first to tenth sub-channels is 10 PRBs, the extra one PRB may be referred to as the remaining frequency domain resource.

In some embodiments, the size of the remaining frequency domain resource may be a remainder obtained by dividing the bandwidth of the resource pool by the sub-channel size. The position of the remaining frequency domain resource may be one or more PRBs with the highest frequency domain position in the resource pool.

In this embodiment, the granularity of the remaining frequency domain resource may be PRBs; and may also be Resource Elements (REs).

S104: Use the remaining frequency domain resource as a first sub-channel independently, or contain the remaining frequency domain resource in the resource pool within a second sub-channel.

The remaining frequency domain resource in the resource pool may be used as the first sub-channel independently. In some embodiments, for example, in the foregoing example, one PRB of the remaining frequency domain resource may be used as one sub-channel independently, which constitutes the eleventh sub-channel or is the first sub-channel. In this way, the first sub-channel may be the sub-channel with the maximum number in the resource pool, or the sub-channel with the minimum number.

The remaining frequency domain resource in the resource pool may further be contained within the second sub-channel. In some embodiments, for example, in the foregoing example, one PRB of the remaining frequency domain resource may be contained within the second sub-channel, the second sub-channel may be the sub-channel with the maximum number in the resource pool, or the sub-channel with the minimum number.

In this example, a size of the second sub-channel in the resource pool is greater than the sub-channel size configured by the higher layer. That is, the remaining frequency domain resource (PRBs) does not occupy a sub-channel number independently, but is directly merged into the second sub-channel and considered to be a part of the second sub-channel.

In the resource determining method provided in the embodiments of the present disclosure, the remaining frequency domain resource in the resource pool is used as a sub-channel independently, or the remaining frequency domain resource in the resource pool is contained within a sub-channel, so that the remaining frequency domain resource in the resource pool can be fully utilized to improve the utilization of the frequency domain resources in the system.

The resource determining method provided in the embodiments of the present disclosure can also avoid the problem that data fails to be received due to ambiguity between a transmitting terminal and a receiving terminal for the mapped resources, and facilitate the improvement of communication efficiency.

In some embodiments, the method 100 may further include the following steps: determining a first resource in the resource pool.

In an example, the determined first resource is a scheduled resource. The example may determine the scheduled resource in the resource pool, for example, determine the size and position of the scheduled resource.

In another example, the determined first resource is second-stage Sidelink Control Information (SCI). The example may determine a resource of the second-stage SCI in the resource pool, for example, determine the size and position of the resource of the second-stage SCI.

In another example, the determined first resource is a measurement resource for measuring at least one of the following: a Channel Busy Ratio (CBR) or a Channel occupancy Ratio (CR). In some embodiments, the measurement resource of the CBR or the CR includes the remaining frequency domain resource; or in some embodiments, the measurement resource of the CBR or the CR does not include the remaining frequency domain resource.

In some embodiments, the method may further include the following steps: determining whether the first resource includes the remaining frequency domain resource or the first sub-channel according to at least one of the following: a DCI indication, an SCI indication, or a higher layer signaling configuration.

The resource determining method provided in the embodiments of the present disclosure is described in detail in the following two cases: The remaining frequency domain resource is used as the first sub-channel independently (case 1) and the remaining frequency domain resource is contained within the second sub-channel (case 2).

Case 1: The remaining frequency domain resource is used as the first sub-channel independently.

1) In the case 1, in a case that the first resource is the scheduled resource, the terminal device may also determine a frequency domain indication bit size of Downlink Control Information (DCI) or SCI according to N+1 sub-channels, where a quantity of sub-channels in the resource pool is N+1, and N is a positive integer.

In some embodiments, in a case that the first resource is the scheduled resource, the terminal device may determine the frequency domain indication bit size of DCI or SCI according to N sub-channels, the number of sub-channels in the resource pool is N+1.

2) In the case 1, the terminal device does not expect to perform at least one of the following on the first sub-channel: being scheduled, transmitting data, receiving data, measuring a CBR, or measuring a CR. The remaining frequency domain resource (or referred to as the remaining PRBs) is not used in this example, so that the complexity of scheduling or implementation of the terminal device can be reduced.

a: The transmitting terminal does not expect to be scheduled on the first sub-channel. For example, the first sub-channel is not scheduled in a frequency domain resource indication of the DCI.

b: The transmitting terminal does not expect to transmit information on the first sub-channel. For example, the sub-channel is not scheduled in a frequency domain resource indication of the SCI.

c: The receiving terminal does not expect to receive information on the first sub-channel.

d: The measurement resource of the CBR or the CR includes the remaining frequency domain resource. That is, the measurement resource of the CBR or the CR performs measurement according to an actual bandwidth of the resource pool, and the bandwidth measured by the CBR or the CR includes the remaining frequency domain resource.

e: The measurement resource of the CBR or the CR does not include the remaining frequency domain resource. That is, the measurement resource of the CBR or the CR performs measurement according to an actual available resource of the resource pool, and the bandwidth measured by the CBR or the CR does not include the remaining frequency domain resource.

3) In the case 1, in a case that the first resource is the scheduled resource or the first resource is the resource of the second-stage SCI, the first resource does not include the first sub-channel.

In some embodiments, in a case that the first resource is a measurement resource for measuring at least one of the following: a CBR or a CR, the first resource does not include the first sub-channel.

4) In the case 1, when scheduling the first sub-channel, the terminal device (for example, transmitting PSSCH), does not schedule the first sub-channel independently, and the first sub-channel is scheduled together with at least one adjacent sub-channel. For example, if the first sub-channel is an $(N+1)^{th}$ sub-channel, the $(N+1)^{th}$ sub-channel needs to be scheduled together with the N sub-channels.

In some embodiments, the measurement resource of the CBR or the CR includes the remaining frequency domain resource.

In an example A, the first resource is the scheduled resource, and the first resource includes the first sub-channel and a second resource. The second resource includes at least a third sub-channel, and a number of the third sub-channel is adjacent to that of the first sub-channel.

In this example, the terminal device may further determine a frequency domain indication bit size of DCI or SCI according to N+1 sub-channels, where a quantity of sub-channels in the resource pool is N+1, and N is a positive integer.

In another example B, the first resource is the resource of the second-stage SCI, and the first resource includes the first sub-channel and a second resource. The second resource includes at least a third sub-channel, and a number of the third sub-channel is adjacent to that of the first sub-channel.

In some embodiments, in a case that the first resource is the scheduled resource, the terminal device may further determine a first Transport Block Size (TBS) according to the first resource.

In some embodiments, in a case that the first resource is the scheduled resource, the terminal device may further perform at least one of the following according to the first resource: resource determining of the second-stage SCI or resource mapping of the second-stage SCI.

In this example, a frequency domain resource (specifically may be a size of the frequency domain resources) available for the second-stage SCI is the same as a frequency domain resource used for determining a TBS. In some embodiments, for example, when the first sub-channel is the sub-channel with the maximum number, if the size of the first sub-channel is not calculated in the calculation of the TBS, the size of the first sub-channel is not calculated in the calculation of the second-stage SCI either.

In this example, if the resource mapping of the second-stage SCI is performed according to the first resource, the second-stage SCI is not mapped on the first sub-channel, or information mapped on the first sub-channel is a repetition of information of the second-stage SCI on a previous resource element.

In some embodiments, in a case that the first resource is the scheduled resource, and the first resource includes the first sub-channel and the second resource, the first resource is used to transmit a target transport block, and a second TBS of the target transport block is determined according to the sub-channel size and a quantity of sub-channels of the first resource. In some embodiments, any one of the following methods 1 to 3 may be used to determine a resource size, and the resource size is used to determine the second TBS.

In some embodiments, in a case that the first resource is the scheduled resource, the first resource includes the first sub-channel and the second resource, and at least one of the following is performed according to the first resource: resource determining of the second-stage SCI or resource mapping of the second-stage SCI, a resource size of the second-stage SCI is determined according to the sub-channel size and the quantity of the sub-channels of the first resource. In some embodiments, any one of the following methods 1 to 3 may be used to determine the resource size of the second-stage SCI.

In some embodiments, in a case that the first resource is the resource of the second-stage SCI and the first resource includes the first sub-channel and the second resource, any one of the following methods 1 to 3 may be used to determine the size of the first resource, that is, the resource size of the second-stage SCI.

Method 1:

a resource size used for determining the second TBS, or the resource size of the second-stage SCI is determined according to the following formula:

$$M = S_{sch} \times \text{Num}_{sch}, \text{ where}$$

M is the resource size used for determining the second TBS, or M is the resource size of the second-stage SCI; $S_{sch}$ is a sub-channel size configured by a higher layer; and $\text{Num}_{sch}$ is the quantity of the sub-channels of the first resource.

When the resource size determined in the method 1 is used to calculate the TBS, for the same Modulation and Coding Scheme (MCS), the calculated TBS is larger than an actual transmittable TBS, and therefore has a loss of demodulation performance compared to the target demodulation performance, possibly resulting in transmission information in excess of the maximum demodulable code rate.

Method 2:

a resource size used for determining the second TBS, or the resource size of the second-stage SCI is determined according to the following formula: $M = S_{sch} \times (\text{Num}_{sch} - 1)$, where M is the resource size used for determining the second TBS, or M is the resource size of the second-stage SCI; $S_{sch}$ is a sub-channel size configured by a higher layer; and $\text{Num}_{sch}$ is the quantity of the sub-channels of the first resource.

When the resource size determined in the method 2 is used to calculate the TBS, for the same MCS, the calculated TBS is smaller than the actual transmittable TBS. Compared to the target performance, the demodulation performance obtained in the method 2 is better. However, the actual transmitted TBS is smaller, resulting in a low resource utilization.

It is specified in R16 that the second-stage SCI is mapped on all RB resources allocated by the PSSCH. However, if the TBS is calculated according to the sub-channel, the second-stage SCI needs to be controlled according to beta proportional to the TBS, so that the $(N+1)^{th}$ sub-channel is not considered in the calculated resource of the second-stage SCI. A beta value is a value configured by the network or indicated by the terminal.

Method 3:

a resource size used for determining the first TBS, and a resource size used for determining the second TBS, or the resource size of the second-stage SCI is determined according to the following formula:

$$M=S_{sch}\times(\text{Num}_{sch}-1)+S_{remain}, \text{where}$$

M is the resource size used for determining the first TBS, or M is the resource size used for determining the second TBS, or M is the resource size of the second-stage SCI; $S_{sch}$ is a sub-channel size configured by a higher layer; $\text{Num}_{sch}$ is the quantity of the sub-channels of the first resource; and $S_{remain}$ is a resource size of the first sub-channel. The resource size $S_{remain}$ is in the unit of PRB or RE.

The resource size $S_{remain}$ is in the unit of PRB or RE.

The first resource determined in the method 3 is closest to the actual available resource.

The methods 1 to 3 actually determine the size of the first resource or the resource size of the second-stage SCI according to the sub-channel size and the quantity of the sub-channels of the first resource.

5) In the case 1, when the terminal schedules the first sub-channel, the first sub-channel may be used to transmit a Physical Sidelink Control CHannel (PSCCH), or SCI (at least one of first level SCI and second-stage SCI), or a special Physical Sidelink Shared CHannel (PSSCH), for example, only including a specific format of SCI, or first-stage SCI, or second-stage SCI, or a first-stage SCI and second-stage SCI, or a special PSSCH (for example, only including a specific logical channel or MAC CE, or only including a signaling plane but not including a data channel), or both of the above.

Case 2: The remaining frequency domain resource is contained within second sub-channel.

The second sub-channel may be the sub-channel with the maximum number in the resource pool, or the sub-channel with the minimum number. In this example, a size of the second sub-channel in the resource pool is greater than the sub-channel size configured by the higher layer. That is, the remaining frequency domain resource (PRBs) does not occupy a sub-channel number independently, but is directly merged into the second sub-channel and considered to be a part of the second sub-channel.

1) In the case 2, in a case that the first resource is the scheduled resource, the first resource includes the second sub-channel. In this example, the terminal device may determine a frequency domain indication bit size of DCI or SCI according to N sub-channels, where a quantity of sub-channels in the resource pool is N, and N is a positive integer.

2) In the case 2, in a case that the first resource is the resource of the second-stage SCI, the first resource includes the second sub-channel.

3) In the case 2, in a case that the first resource is the scheduled resource and the first resource includes the second sub-channel, the terminal device may further determine a third TB S according to the first resource.

4) In the case 2, in a case that the first resource is the scheduled resource and the first resource includes the second sub-channel, the terminal device may further perform at least one of the following according to the first resource:

resource determining of the second-stage SCI or resource mapping of the second-stage SCI.

In some embodiments, a frequency domain resource (specifically may be a size of the frequency domain resource) available for the second-stage SCI is the same as a frequency domain resource (specifically may also be a size of the frequency domain resource) used for determining a TBS.

In some embodiments, if the resource mapping of the second-stage SCI is performed according to the first resource, the second-stage SCI is not mapped on the remaining frequency domain resource, or information mapped on the remaining frequency domain resource is a repetition of information of the second-stage SCI on a previous resource element.

In some embodiments, in a case that the first resource is the scheduled resource and the first resource includes the second sub-channel, the first resource is used to transmit a target transport block, and a fourth TBS of the target transport block is determined according to the sub-channel size and a quantity of sub-channels of the first resource. In some embodiments, any one of the following methods 4 and 5 may be used to determine a resource size, and the resource size is used to determine the fourth TBS.

In some embodiments, in a case that the first resource is the scheduled resource, the first resource includes the second sub-channel, and at least one of the following is performed according to the first resource: resource determining of the second-stage SCI or resource mapping of the second-stage SCI, a resource size of the second-stage SCI is determined according to the sub-channel size and the quantity of the sub-channels of the first resource. In some embodiments, any one of the following methods 4 and 5 may be used to determine the resource size of the second-stage SCI.

In some embodiments, in a case that the first resource is the resource of the second-stage SCI and the first resource includes the second sub-channel, any one of the following methods 4 and 5 may be used to determine the size of the first resource, that is, the resource size of the second-stage SCI.

Method 4:

a resource size used for determining the fourth TBS, or the resource size of the second-stage SCI is determined according to the following formula:

$$M=S_{sch}\times\text{Num}_{sch}, \text{where}$$

M is the resource size used for determining the fourth TBS, or M is the resource size of the second-stage SCI; $S_{sch}$ is the sub-channel size configured by a higher layer; and $\text{Num}_{sch}$ is the quantity of the sub-channels of the first resource.

When the resource size calculated in the method 4 is used to calculate the TBS, the calculated TBS is smaller than the transmittable TBS, resulting in a low resource utilization. However, the compatibility after agreement is better.

Method 5:

a resource size used for determining the third TBS, a resource size used for determining the fourth TBS, or the resource size of the second-stage SCI is determined according to the following formula:

$$M=S_{sch}\times(\text{Num}_{sch}-1)+S_{sch}+S_{remain}, \text{where}$$

M is the resource size used for determining the second TBS, or M is the resource size used for determining the fourth TBS, or M is the resource size of the second-stage SCI; $S_{sch}$ is a sub-channel size configured by a higher layer;

$Num_{sch}$ is the quantity of the sub-channels of the first resource; and $S_{remain}$ is a size of the remaining frequency domain resource.

$S_{sch}+S_{remain}$ in the formula is the size of the second sub-channel.

In the method 5, the TBS is calculated according to the quantity of resources of the actual scheduled PRBs.

In order to describe the resource determining method provided in the embodiments of the present disclosure in detail, the following description is given with reference to several specific embodiments.

Embodiment 1

A size of a pre-configured resource pool is 101 PRBs, the sub-channel size in the resource pool is 10 PRBs, the quantity of the sub-channels is 11, each sub-channel size of the first to tenth sub-channels is 10 PRBs, and the size of the eleventh sub-channel is 1 PRB.

The transmitting terminal does not expect to be scheduled on the eleventh sub-channel, and the transmitting terminal does not expect to transmit information on the eleventh sub-channel.

Embodiment 2

A size of a pre-configured resource pool is 101 PRBs, the sub-channel size in the resource pool is 10 PRBs, the quantity of the sub-channels is 11, each sub-channel size of the first to tenth sub-channels is 10 PRBs, and the size of the eleventh sub-channel is 1 PRB.

The sub-channels 9, 10 and 11 indicated by the terminal device are used for PSSCH transmission, that is, the scheduled resource is the sub-channels 9, 10 and 11.

In the process of determining a TBS, the TBS is determined according to 10 PRBs*2 sub-channels=20 PRBs.

An available resource of the second-stage SCI is 10 PRBs*2 sub-channels=20 PRBs, and the available resource of the second-stage SCI is determined according to the 20 PRBs. During mapping, the second-stage SCI is not mapped on the eleventh sub-channel; or during mapping, the information transmitted on the eleventh sub-channel is a repetition of information in the $100^{th}$ PRB.

Embodiment 3

A size of a pre-configured resource pool is 101 PRBs, the sub-channel size in the resource pool is 9 PRBs, the quantity of the sub-channels is 10, each sub-channel size of the first to ninth sub-channels is 10 PRBs, and the size of the tenth sub-channel is 11 PRBs.

The sub-channels 9 and 10 indicated by the terminal device are used for PSSCH transmission, that is, the scheduled resource is the sub-channels 9 and 10.

In the process of calculating a TBS, the TBS is calculated according to 10 PRBs*2 sub-channels=20 PRBs.

An available resource of the second-stage SCI is 10 PRBs*2 sub-channels=20 PRBs, and the available resource of the second-stage SCI is calculated according to the 20 PRBs. During mapping, the second-stage SCI is not mapped on the 101st PRB; or the information transmitted on the 101st PRB is a repetition of information on the $100^{th}$ PRB.

The resource determining method according to the embodiments of the present disclosure is described in detail above with reference to FIG. 1. The terminal device according to the embodiments of the present disclosure is described in detail below with reference to FIG. 2.

Figure 2:
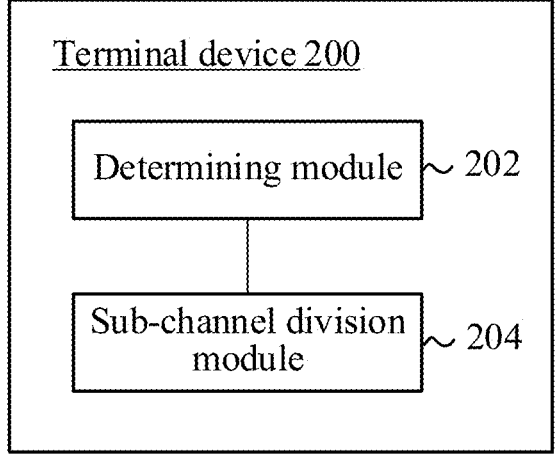
FIG. 2 is a schematic structural diagram of a terminal device according to an embodiment of the present disclosure.

FIG. 2 is a schematic structural diagram of a terminal device according to an embodiment of the present disclosure. As shown in FIG. 2, the terminal device 200 includes:

a determining module 202, configured to determine a remaining frequency domain resource in a resource pool according to a sub-channel size; and a sub-channel division module, configured to use the remaining frequency domain resource as a first sub-channel independently, or contain the remaining frequency domain resource in the resource pool within a second sub-channel.

In the embodiments of the present disclosure, the remaining frequency domain resource in the resource pool is used as a sub-channel independently, or the remaining frequency domain resource in the resource pool is contained within a sub-channel, so that the remaining frequency domain resource can be fully utilized to improve the utilization of the frequency domain resources in the system.

For example, as an embodiment, the determining module 202 may be further configured to: determine a first resource in the resource pool.

For example, as an embodiment, the first resource is a scheduled resource.

For example, as an embodiment, the first resource is a resource of second-stage SCI.

For example, as an embodiment, the first resource is a measurement resource for measuring at least one of: a CBR or a channel occupancy rate (CR).

For example, as an embodiment, the first resource does not include the first sub-channel.

For example, as an embodiment, the terminal device does not expect to perform at least one of the following on the first sub-channel: being scheduled, transmitting data, receiving data, measuring a CBR, or measuring a CR.

For example, as an embodiment, the first resource includes the first sub-channel and a second resource, the second resource includes at least a third sub-channel, and a number of the third sub-channel is adjacent to that of the first sub-channel.

For example, as an embodiment, in a case that the first resource is the scheduled resource, the determining module 202 may be configured to: determine a frequency domain indication bit size of DCI or SCI according to N+1 sub-channels, where a quantity of sub-channels in the resource pool is N+1; or determine the frequency domain indication bit size of DCI or SCI according to N sub-channels, where N is a positive integer.

For example, as an embodiment, in a case that the first resource is the scheduled resource, the determining module 202 may be configured to: determine a first transport block size TBS according to the first resource.

For example, as an embodiment, in a case that the first resource is the scheduled resource, the determining module 202 may be configured to: perform at least one of the following according to the first resource: resource determining of the second-stage SCI; or resource mapping of the second-stage SCI.

For example, as an embodiment, a frequency domain resource available for the second-stage SCI is the same as a frequency domain resource used for determining a TBS.

For example, as an embodiment, if the resource mapping of the second-stage SCI is performed according to the first resource, the second-stage SCI is not mapped on the first sub-channel, or information mapped on the first sub-channel is a repetition of information of the second-stage SCI on a previous resource element.

For example, as an embodiment, in a case that the first resource is the scheduled resource, the first resource is used to transmit a target transport block, and a second TBS of the target transport block is determined according to the sub-channel size and a quantity of sub-channels of the first resource, or a resource size of the second-stage SCI is determined according to the sub-channel size and the quantity of the sub-channels of the first resource.

For example, as an embodiment, a resource size used for determining the second TBS, or the resource size of the second-stage SCI is determined according to the following formula: $M=S_{sch}\times Num_{sch}$, where M is the resource size used for determining the second-stage SCI, or M is the resource size of the second-stage SCI; $S_{sch}$ is a sub-channel size configured by a higher layer; and $Num_{sch}$ is the quantity of the sub-channels of the first resource.

For example, as an embodiment, a resource size used for determining the second TBS, or the resource size of the second-stage SCI is determined according to the following formula: $M=S_{sch}\times(Num_{sch}-1)$, where M is the resource size used for determining the second TBS, or M is the resource size of the second-stage SCI; $S_{sch}$ is a sub-channel size configured by a higher layer; and $Num_{sch}$ is the quantity of the sub-channels of the first resource.

For example, as an embodiment, a resource size used for determining the first TBS, a resource size used for determining the second TBS, or the resource size of the second-stage SCI is determined according to the following formula: $M=S_{sch}\times(Num_{sch}-1)+S_{remain}$, where M is the resource size used for determining the first TBS, or M is the resource size used for determining the second TBS, or M is the resource size of the second-stage SCI; $S_{sch}$ is a sub-channel size configured by a higher layer; $Num_{sch}$ is the quantity of the sub-channels of the first resource; and $S_{remain}$ is a resource size of the first sub-channel.

For example, as an embodiment, the first sub-channel is used to transmit at least one of the following: a PSCCH or a special PSSCH.

For example, as an embodiment, a number of the first sub-channel is a maximum number or a minimum number in the resource pool; or a number of the second sub-channel is a maximum number or a minimum number in the resource pool.

For example, as an embodiment, the first resource includes the second sub-channel.

For example, as an embodiment, in a case that the first resource is the scheduled resource, the determining module 202 may be configured to: determine a frequency domain indication bit size of DCI or SCI according to N sub-channels, where a quantity of sub-channels in the resource pool is N; and N is a positive integer.

For example, as an embodiment, in a case that the first resource is the scheduled resource, the determining module 202 may be configured to: determine a third TBS according to the first resource.

For example, as an embodiment, in a case that the first resource is the scheduled resource, the determining module 202 may be configured to: perform at least one of the following according to the first resource: resource determining of the second-stage SCI; or resource mapping of the second-stage SCI.

For example, as an embodiment, a frequency domain resource available for the second-stage SCI is the same as a frequency domain resource used for determining a TBS.

For example, as an embodiment, if the resource mapping of the second-stage SCI is performed according to the first resource, the second-stage SCI is not mapped on the remaining frequency domain resource, or information mapped on the remaining frequency domain resource is a repetition of information of the second-stage SCI on a previous resource element.

For example, as an embodiment, in a case that the first resource is the scheduled resource, the first resource is used to transmit a target transport block, and a fourth TBS of the target transport block is determined according to the sub-channel size and a quantity of sub-channels of the first resource, or a resource size of the second-stage SCI is determined according to the sub-channel size and the quantity of the sub-channels of the first resource.

For example, as an embodiment, a resource size used for determining the fourth TBS, or the resource size of the second-stage SCI is determined according to the following formula: $M=S_{sch}\times Num_{sch}$, where M is the resource size used for determining the fourth TBS, or M is the resource size of the second-stage SCI; $S_{sch}$ is a sub-channel size configured by a higher layer; and $Num_{sch}$ is the quantity of the sub-channels of the first resource.

For example, as an embodiment, a resource size used for determining the third TBS, a resource size used for determining the fourth TBS, or the resource size of the second-stage SCI is determined according to the following formula: $M=S_{sch}\times(Num_{sch}-1)+S_{sch}+S_{remain}$, where M the resource size used for determining the third TBS, or M is the resource size used for determining the fourth TBS, or M is the resource size of the second-stage SCI; $S_{sch}$ is a sub-channel size configured by a higher layer; $Num_{sch}$ is the quantity of the sub-channels of the first resource; and $S_{remain}$ is a size of the remaining frequency domain resource.

For example, as an embodiment, a measurement resource of the CBR or the CR includes the remaining frequency domain resource.

For example, as an embodiment, the measurement resource of the CBR or the CR does not include the remaining frequency domain resource.

For example, as an embodiment, the remaining frequency domain resource meet at least one of the following: a size of the remaining frequency domain resource is less than the sub-channel size; or the remaining frequency domain resource are determined by a bandwidth of the resource pool and a sub-channel size configured by a higher layer.

For example, as an embodiment, the determining module 202 may be configured to: determine whether the first resource includes the remaining frequency domain resource or the first sub-channel according to at least one of the following: a DCI indication, an SCI indication, or a higher layer signaling configuration.

For the terminal device 200 according to the embodiments of the present disclosure, reference may be made to the process corresponding to the method 100 of the embodiments of the present disclosure, and the units/modules and other operations and/or functions described above in the terminal device 200 are respectively intended to implement the corresponding process in the method 100 and can achieve the same or equivalent technical effects. This is not described herein again for brevity.

The embodiments in this specification are described in a progressive manner, and each embodiment usually focuses on the differences from other embodiments. For the same and similar parts among the embodiments, mutual reference may be made. A device embodiment is basically similar to a method embodiment, and therefore is described briefly. For related parts, reference may be made to partial descriptions in the method embodiment.

In a case that an indefinite or definite article (for example, "a", "an", and "the") is used in reference to a singular noun, the singular noun includes the plural of that noun unless otherwise specifically stated.

In addition, the terms "first" and "second" are used in the specification and claims to distinguish between similar sub-channels and resources, and these terms do not necessarily describe an order or a chronological order. It should be understood that the terms used in the embodiments of the present disclosure are interchangeable under appropriate circumstances and the embodiments of the present disclosure described herein can be operated in an order other than that described or illustrated herein.

Figure 3:
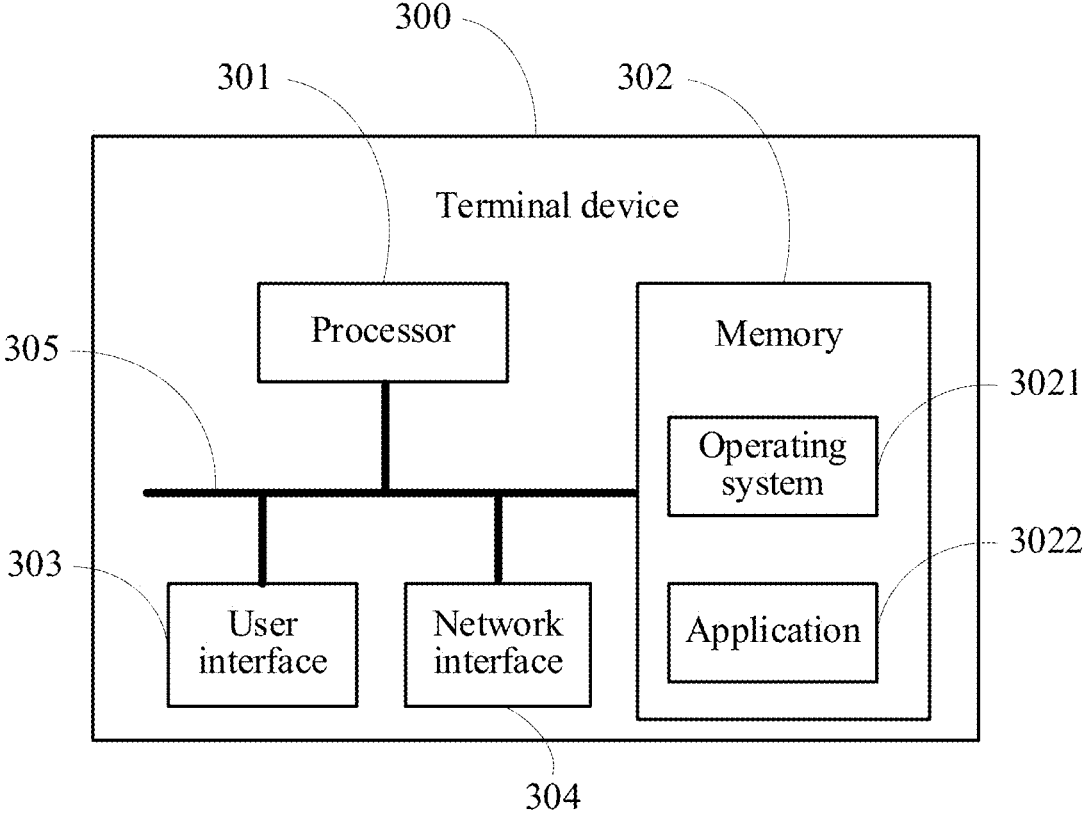
FIG. 3 is a schematic structural diagram of a terminal device according to another embodiment of the present disclosure.

FIG. 3 is a block diagram of a terminal device according to another embodiment of the present disclosure. The terminal device 300 shown in FIG. 3 includes at least a processor 301, a memory 302, at least a network interface 304, and a user interface 303. All the components in the terminal device 300 are coupled together by a bus system 305. It may be understood that the bus system 305 is configured to implement connection and communication between the components. In addition to a data bus, the bus system 305 further includes a power bus, a control bus, and a status signal bus. However, for ease of clear description, all types of buses are marked as the bus system 305 in FIG. 3.

The user interface 303 may include a display, a keyboard, a clicking device (for example, a mouse, a trackball), a touch panel or a touchscreen, and the like.

It should be understood that, the memory 302 in the embodiments of the present disclosure may be a volatile memory or a non-volatile memory, or may include both a volatile memory and a non-volatile memory. The non-volatile memory may be a Read-Only Memory (ROM), a Programmable ROM (PROM), an Erasable PROM (EPROM), an Electrically EPROM (EEPROM) or a flash memory. The volatile memory may be a Random Access Memory (RAM), used as an external cache. By way of example but not limitative description, many forms of RAMs may be used, for example, a Static RAM (SRAM), a Dynamic RAM (DRAM), a Synchronous DRAM (SDRAM), a Double Data Rate SDRAM (DDRSDRAM), an Enhanced SDRAM (ESDRAM), a Synchlink DRAM (SLDRAM) and a Direct Rambus RAM (DRRAM). The memory 302 in the system and method described in the embodiments of the present disclosure includes, but is not limited to, these memories and any other suitable types.

In some implementations, the memory 302 stores the following elements: an executable module or a data structure, or a subset thereof, or an extension set thereof: an operating system 3021 and an application 3022.

The operating system 3021 includes various system programs, for example, a framework layer, a core library layer, a driver layer, and the like, which are used for implementing various basic services and processing a task according to hardware. The application 3022 includes various applications, for example, a media player and a browser, used for implementing various application services. A program for implementing the method in the embodiments of the present disclosure may be included in the application 3022.

In this embodiment of the present disclosure, the terminal device 300 further includes: a computer program stored on the memory 302 and executable by the processor 301, when executed by the processor 301, the computer program implements the following steps of the method 100 in the embodiments of the present disclosure.

The method disclosed in the embodiments of the present disclosure may be applied to the processor 301 or implemented by the processor 301. The processor 301 may be an integrated circuit chip, having a capability of processing a signal. In an implementation process, steps in the foregoing methods can be implemented by using a hardware integrated logical circuit in the processor 301, or by using instructions in a form of software. The foregoing processor 301 may be a general-purpose processor, a Digital Signal Processor (DSP), an Application Specific Integrated Circuit (ASIC), a Field Programmable Gate Array (FPGA) or another programmable logic device, a discrete gate or a transistor logic device, or a discrete hardware component; and may implement or perform the methods, the steps, and logic block diagrams that are disclosed in the embodiments of the present disclosure. The general-purpose processor may be a microprocessor, or the processor may be any conventional processor or the like. The steps of the methods disclosed with reference to the embodiments of the present application may be directly performed and completed by using a hardware decoding processor, or may be performed and completed by using a combination of hardware and software modules in the decoding processor. The software module may be stored in a computer-readable storage medium that is mature in the art, such as a RAM, a flash memory, a read-only memory, a programmable read-only memory, an electrically erasable programmable memory, or a register. The computer-readable storage medium is located in the memory 302, and the processor 301 reads information in the memory 302, and completes the steps in the foregoing methods in combination with hardware thereof. In some embodiments, the computer-readable storage medium stores a computer program, the computer program, when executed by the processor 301, implements the steps of the foregoing method 100 in the embodiments of the present disclosure.

It should be understood that, the embodiments described in the embodiments of the present application may be implemented by using software, hardware, firmware, middleware, microcode, or a combination thereof. For hardware implementation, a processing unit may be implemented in one or more Application Specific Integrated Circuits (ASICs), a Digital Signal Processor (DSP), a DSP Device (DSPD), a Programmable Logic Device (PLD), a Field-Programmable Gate Array (FPGA), a general-purpose processor, a controller, a micro-controller, a microprocessor, and other electronic units configured to execute the functions in this application, or a combination of the above.

For implementation by software, the technologies in the embodiments may be implemented by performing the functional modules (for example, a process and a function) in the embodiments of the present application. Software code may be stored in a memory and executed by a processor. The memory may be implemented inside or outside the processor.

The terminal device 300 can implement each of the processes implemented by the terminal device in the foregoing embodiments, and can achieve the same or equivalent technical effects. To avoid repetition, details are not described herein again.

An embodiment of the present disclosure further provides a computer-readable storage medium, storing a computer program. The computer program, when executed by a processor, implements the processes of the embodiment of the method 100, and can achieve the same technical effects. To avoid repetition, details are not described herein again. The computer-readable storage medium is, for example, a Read-Only Memory (ROM), a Random Access Memory (RAM), a magnetic disk, or an optical disc.

It should be noted that the terms "include", "comprise", or any other variation thereof in this application is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one . . . does not exclude that there are still other same elements in the processes, methods, objects, or apparatuses.

Through the descriptions of the foregoing implementations, a person skilled in the art may clearly understand that the methods in the foregoing embodiments may be implemented by means of software and a necessary general hardware platform, and certainly, may also be implemented by hardware, but in many cases, the former manner is a better implementation. Based on such an understanding, the technical solutions of the present disclosure essentially or the part contributing to the prior art may be implemented in a form of a software product. The computer software product is stored in a storage medium (for example, a ROM/ RAM, a magnetic disk, or an optical disc) and includes several instructions for instructing a terminal (which may be a mobile phone, a computer, a server, an air conditioner, a network device, or the like) to perform the methods described in the embodiments of the present disclosure.

The embodiments of the present disclosure are described above with reference to the accompanying drawings. However, the present disclosure is not limited to the specific embodiments described above, and the specific embodiments described above are merely exemplary and not limitative. A person of ordinary skill in the art may make many forms without departing from the idea of the present disclosure and the protection scope of the claims. All of the forms shall fall within the protection of the present disclosure.

What is claimed is:

1. A resource determining method, performed by a terminal device, comprising:
  determining a remaining frequency domain resource in a resource pool according to a sub-channel size, wherein a size of the remaining frequency domain resource is less than the sub-channel size; and
  using the remaining frequency domain resource as a first sub-channel independently, or containing the remaining frequency domain resource in the resource pool within a second sub-channel.

2. The method according to claim 1, further comprising: determining a first resource in the resource pool.

3. The method according to claim 2, wherein the first resource is a scheduled resource, or the first resource is a resource of second-stage Sidelink Control Information (SCI).

4. The method according to claim 2, wherein the first resource is a measurement resource for measuring at least one of the following: a Channel Busy Rate (CBR) or a Channel occupancy Rate (CR).

5. The method according to claim 3, wherein the first resource does not comprise the first sub-channel.

6. The method according to claim 3, wherein the first resource comprises the first sub-channel and a second resource,
  the second resource comprises at least a third sub-channel, and a number of the third sub-channel is adjacent to that of the first sub-channel.

7. The method according to claim 6, wherein when the first resource is the scheduled resource, the method further comprises:

determining a frequency domain indication bit size of Downlink Control Information (DCI) or SCI according to N+1 sub-channels; or
  determining the frequency domain indication bit size of DCI or SCI according to N sub-channels, wherein
  a quantity of sub-channels in the resource pool is N+1, and N is a positive integer.

8. The method according to claim 6, wherein when the first resource is the scheduled resource, the method further comprises: determining a first Transport Block Size (TBS) according to the first resource.

9. The method according to claim 6, wherein when the first resource is the scheduled resource, the method further comprises: performing at least one of the following according to the first resource:
  resource determining of the second-stage SCI; or
  resource mapping of the second-stage SCI.

10. The method according to claim 1, wherein the first sub-channel is used to transmit at least one of the following: a Physical Sidelink Control CHannel (PSCCH) or a special Physical Sidelink Shared CHannel (PSSCH).

11. The method according to claim 1, wherein
  a number of the first sub-channel is a maximum number or a minimum number in the resource pool; or
  a number of the second sub-channel is the maximum number or the minimum number in the resource pool.

12. The method according to claim 3, wherein the first resource comprises the second sub-channel.

13. The method according to claim 12, wherein when the first resource is the scheduled resource, the method further comprises:
  determining a frequency domain indication bit size of DCI or SCI according to N sub-channels, wherein a quantity of sub-channels in the resource pool is N, and N is a positive integer.

14. The method according to claim 12, wherein when the first resource is the scheduled resource, the method further comprises: determining a third Transport Block Size (TBS) according to the first resource.

15. The method according to claim 12, wherein when the first resource is the scheduled resource, the method further comprises: performing at least one of the following according to the first resource:
  resource determining of the second-stage SCI; or
  resource mapping of the second-stage SCI.

16. The method according to claim 4, wherein the measurement resource of the CBR or the CR comprises the remaining frequency domain resource.

17. The method according to claim 4, wherein the measurement resource of the CBR or the CR does not comprise the remaining frequency domain resource.

18. The method according to claim 1, wherein the remaining frequency domain resource further meets the following:
  the remaining frequency domain resource is determined by a bandwidth of the resource pool and the sub-channel size configured by a higher layer.

19. A terminal device, comprising:
  a memory storing computer-readable instructions; and
  a processor coupled to the memory and configured to execute the computer-readable instructions, wherein the computer-readable instructions, when executed by the processor, cause the processor to perform operations comprising:
    determining a remaining frequency domain resource in a resource pool according to a sub-channel size, wherein a size of the remaining frequency domain resource is less than the sub-channel size; and using the remaining frequency domain resource as a first sub-channel independently, or containing the remaining frequency domain resource in the resource pool within a second sub-channel.

20. A non-transitory computer-readable medium storing instructions that, when executed by a processor, cause the processor to perform operations comprising:

determining a remaining frequency domain resource in a resource pool according to a sub-channel size, wherein a size of the remaining frequency domain resource is less than the sub-channel size; and using the remaining frequency domain resource as a first sub-channel independently, or containing the remaining frequency domain resource in the resource pool within a second sub-channel.

* * * * *